(12) United States Patent
Cheng

(10) Patent No.: US 10,833,719 B2
(45) Date of Patent: Nov. 10, 2020

(54) PROTECTIVE CASE FOR MOBILE PHONE AND TABLET COMPUTER

(71) Applicant: Ganhua Cheng, Anqing (CN)

(72) Inventor: Ganhua Cheng, Anqing (CN)

(*) Notice: Subject to any disclaimer, the term of this patent is extended or adjusted under 35 U.S.C. 154(b) by 0 days.

(21) Appl. No.: 16/683,285

(22) Filed: Nov. 14, 2019

(65) Prior Publication Data

US 2020/0304163 A1 Sep. 24, 2020

(30) Foreign Application Priority Data

Mar. 22, 2019 (CN) .................... 2019 2 0373820 U

(51) Int. Cl.
*H04B 1/3888* (2015.01)
*A45C 11/00* (2006.01)

(52) U.S. Cl.
CPC ............ *H04B 1/3888* (2013.01); *A45C 11/00* (2013.01); *A45C 2011/002* (2013.01); *A45C 2011/003* (2013.01)

(58) Field of Classification Search
CPC . H04B 1/3888; A45C 11/00; A45C 2011/002; A45C 2011/003
See application file for complete search history.

(56) References Cited

U.S. PATENT DOCUMENTS

| 2008/0006748 | A1* | 1/2008 | Watanabe | F16M 11/08 248/186.2 |
| 2010/0283725 | A1* | 11/2010 | Tang | G06F 1/1632 345/156 |
| 2015/0230351 | A1* | 8/2015 | Yeo | F16B 2/12 248/205.5 |
| 2017/0000250 | A1* | 1/2017 | Carnevali | A45F 5/10 |
| 2018/0122201 | A1* | 5/2018 | Chiang | H04M 1/0297 |

* cited by examiner

*Primary Examiner* — Yuwen Pan
*Assistant Examiner* — Fatuma G Sherif

(57) ABSTRACT

The present disclosure relates to a field of accessories for mobile phone and tablet computer, in particular to a protective case for a mobile phone and a tablet computer. The present disclosure provides the protective case for the mobile phone and the tablet computer, including a main body and a rotatable bottom support located at a lower end of the main body. A surface support configured to match with the bottom support is disposed on an upper end of the main body, and a supporting plate is disposed on the surface support. The bottom support includes a limiting surface configured to match with the surface support, elastic positioning parts disposed on the bottom support, positioning points, and a plurality of limiting columns. The elastic positioning parts are made of plastic.

6 Claims, 2 Drawing Sheets

PROTECTIVE CASE FOR MOBILE PHONE AND TABLET COMPUTER

TECHNICAL FIELD

The present disclosure relates to a field of accessories for mobile phone and tablet computer, in particular to a protective case for a mobile phone and a tablet computer.

BACKGROUND

With development of society and continuous development of science and technology, electronic products serve as related products that operate based on electric energy, which brings great convenience to daily life and work of human beings. Therein, mobile phones and tablet computers serve as common electronic products and are widely used in the daily life of the human beings. In order to protect the mobile phones and the tablet computers, the mobile phones and the tablet computers are usually required to be equipped with protective cases.

Protective cases for the mobile phones and the tablet computers in the present market are generally in an integrated form, which protects the mobile phones and the tablet computers by installing the protective cases. However, the technical scheme also has following defects in actual use: conventional protective cases for the mobile phones and the tablet computers are generally simple in structure and most protective cases are fixedly-arranged protective cases, which is unable to achieve 360-degree free rotation of the mobile phones and the tablet computers. Moreover, supporting angles are not able to be adjusted arbitrarily. Thus, providing a protective case for a mobile phone and a tablet computer becomes a problem to be solved at present.

SUMMARY

An object of the present disclosure is to provide a protective case for a mobile phone and a tablet computer, which solves above problems that conventional protective cases for mobile phones and tablet computers cannot achieve 360-degree free rotation and adjust supporting angles arbitrarily at the same time.

In order to achieve the object, the present disclosure provides following technical solutions:

The protective case for the mobile phone and the tablet computer includes a main body and a rotatable bottom support located at a lower end of the main body. A surface support configured to match with the bottom support is disposed on an upper end of the main body, and a supporting plate is disposed on the surface support. The bottom support includes a limiting surface configured to match with the surface support, elastic positioning parts disposed on the bottom support, positioning points, and a plurality of limiting columns. The plurality of the limiting columns are uniformly disposed on an upper end of the limiting surface. The elastic positioning parts are made of plastic. The positioning points are uniformly disposed on the bottom support at an outer side of the elastic positioning parts. The surface support is positioned by cooperation of the limiting surface and the limiting columns, and the free rotation of the main body is achieved by controlling degree of tightness through using the plurality of the elastic positioning parts at the same time, so that the protective case for the mobile phone and the tablet computer freely rotates. The main body is supported by the supporting plate, so that users further adjust the supporting angles arbitrarily. Due to a fact that the elastic positioning parts are made of the plastic, a production and assembly error is solved by utilizing free elasticity of the plastic, and noise is further effectively reduced in a rotating process.

Furthermore, a plurality of through holes, configured to match with screws, are disposed on the bottom support. The plurality of detachable screws are respectively screwed with corresponding through holes, and the surface support is positioned by the cooperation of the limiting surface and the limiting columns at the same time, so that the screws are further configured to fix the bottom support and the surface support.

Furthermore, the supporting plate is hinged with the surface support. When a hinged position of the supporting plate and the surface support rotates outwards, an L-shaped support is formed to support the main body.

Furthermore, the plurality of limiting columns are disposed on the upper end of the limiting surface in an annular array.

Furthermore, the elastic positioning parts are arc-shaped.

Furthermore, a surface cover is correspondingly disposed on the surface support, and the surface cover is engaged with the surface support. When the supporting plate is not in a configuration of use, the surface cover covers the supporting plate, so that the supporting plate is protected. Moreover, installation and disassembly of the surface cover are convenient.

Furthermore, a connecting part matched with the limiting surface is correspondingly disposed on a lower end of the surface support.

Compared with the prior art, the present disclosure has following advantages:

1. The present disclosure provides the protective case for the mobile phone and the tablet computer, including the limiting surface and the limiting columns. The surface support is positioned by cooperation of the limiting surface and the limiting columns, and the 360-degree free rotation of the main body is achieved by controlling degree of tightness through using the plurality of the elastic positioning parts at the same time. The main body is supported by the supporting plate, so that users further adjust the supporting angles arbitrarily. The present disclosure solves the problems that the conventional protective cases for the mobile phones and the tablet computers cannot achieve the 360-degree free rotation and adjust the supporting angles arbitrarily at the same time.

2. The present disclosure provides the protective case for the mobile phone and the tablet computer, including the elastic positioning parts. Due to a fact that the elastic positioning parts are made of the plastic, the production and assembly error is solved by utilizing the free elasticity of the plastic, and the noise is further effectively reduced in the rotating process.

3. The present disclosure provides the protective case for the mobile phone and the tablet computer, which is capable to be carried with a hand strap. So that users can freely rotate the protective case on palms, and the service lives of the mobile phones and the tablet computers are effectively prolonged.

BRIEF DESCRIPTION OF DRAWINGS

In order to clearly explain of technical scheme of the embodiments of the present disclosure, the drawings are included to provide a further understanding of embodiments of the present disclosure. Obviously, the drawings in the following description are merely some of the embodiments of the present disclosure.

Figure 1:
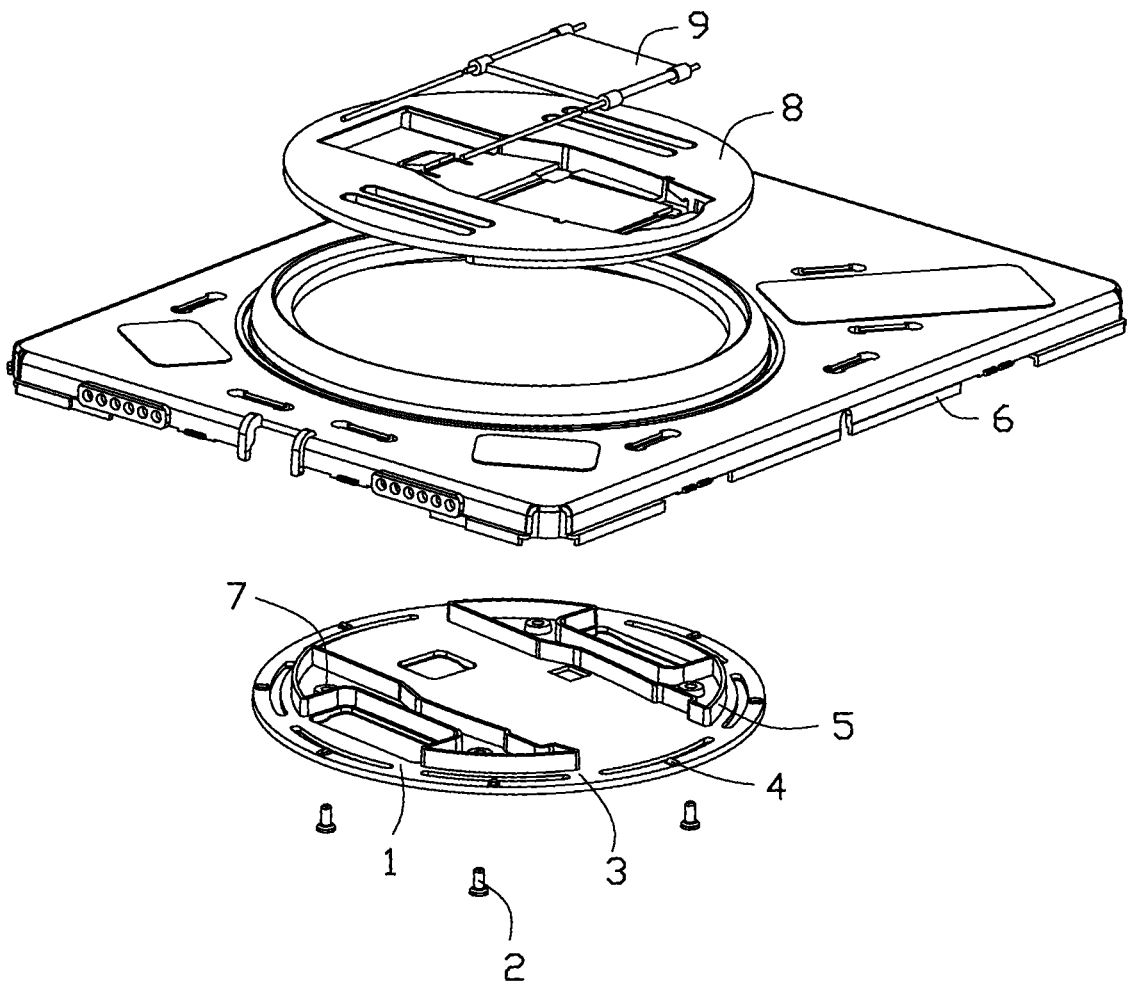
FIG. 1 is a structural schematic diagram of a protective case for the mobile phone and the tablet computer of the present disclosure.

In the drawings: 1. bottom support; 2. screw; 3. elastic positioning part; 4. positioning point; 5. limiting surface; 6. main body; 7. limiting column; 8. surface support; 9. supporting plate; 10. connecting part.

DETAILED DESCRIPTION

In order to make technical problems, technical schemes and beneficial effects solved by the present disclosure clearer, the present disclosure is further described below in detail with reference to the accompanying drawings and embodiments. It should be understood that the specific embodiments described herein are only used to explain the present disclosure and are not intended to limit the present disclosure.

As shown in FIG. 1, in one embodiment, the present disclosure provides a protective case for a mobile phone and a tablet computer, including a main body 6 and a rotatable bottom support 1 located at a lower end of the main body 6. A surface support 8 configured to match with the bottom support 1 is disposed on an upper end of the main body 6. When in use, a lower end of the surface support 8 is embedded into the main body 6 and forms into a whole with the bottom support 1. Rotation of the main body 6 is achieved by the bottom support 1, so that 360-degree free rotation of the protective case for the mobile phone and the tablet computer is further achieved.

Furthermore, in one embodiment, in order to conveniently support and fix the main body 6, a supporting plate 9 is further disposed on the surface support 8. The main body 6 is supported by the supporting plate 9, and by cooperating with the 360-degree free rotation of the main body for the mobile phone and the tablet computer, where users can adjust supporting angles arbitrarily.

Furthermore, in one embodiment, the bottom support 1 includes a limiting surface 5 configured to match with the surface support 8, elastic positioning parts 3 disposed on the bottom support 1, positioning points 4, and a plurality of limiting columns 7. The plurality of the limiting columns 7 are uniformly disposed on an upper end of the limiting surface 5. The surface support 8 is positioned by cooperation of the limiting surface 5 and the limiting columns 7.

Furthermore, in one embodiment of the present disclosure, the elastic positioning parts 3 are made of plastic. The surface support 8 is positioned by cooperation of the limiting surface 5 and the limiting columns 7, and the free rotation of the main body 6 is achieved by controlling degree of tightness of the bottom support 1 and the main body 6 through use of the plurality of the elastic positioning parts 3 at the same time. Meanwhile, due to a fact that the elastic positioning parts 3 are made of plastic, a production and assembly error is solved by utilizing free elasticity of the plastic, and noise is further effectively reduced when rotating.

Furthermore, in one embodiment, the plurality of positioning points 4 are uniformly disposed on the bottom support 1 at an outer side of the elastic positioning parts 3. The bottom support 1 and the surface support 8 are positioned in a connecting process by the positioning points 4, which effectively improves installation efficiency.

Furthermore, a plurality of through holes, configured to match with screws 2 are disposed on the bottom support 1. The plurality of detachable screws 2 are respectively screwed with corresponding through holes, and the surface support 8 is positioned by the cooperation of the limiting surface 5 and the limiting columns 7 at the same time, so that the screws 2 are further configured to fix the bottom support 1 and the surface support 8.

As shown in FIG. 1, in one embodiment, the supporting plate 9 is hinged with the surface support 8, a hinged position of the supporting plate 9 and the surface support 8 is connected by a telescopic mechanism. When the hinged position of the supporting plate 9 and the surface support 8 rotates outwards, an L-shaped support is formed to support the main body 6.

Furthermore, in one embodiment, the telescopic mechanism can be a telescopic rod or other structures capable of playing a telescopic role. By setting the telescopic mechanism, a distance between the supporting plate 9 and the surface support 8 is adjusted according to requirements of the users. Therefore, a height from the surface support 8 and the main body 6 to a desk (not shown in the drawings) is controlled by the supporting plate 9.

Furthermore, in one embodiment, the plurality of limiting columns 7 are disposed on the upper end of the limiting surface 5 in an annular array. The surface support 8 is positioned by cooperation of the limiting surface 5 and the limiting columns 7. By setting the plurality of the limiting columns 7, a positioning effect is effectively improved.

As shown in FIG. 1, in one embodiment, an opening configured to install the bottom support 1 is disposed on the main body 6. The bottom support 1 and the surface support 8 form into a whole, and a middle of the whole passes through the opening disposed on the main body 6. A size of the bottom support 1 and the surface support 8 is set to be larger than the size of the opening disposed on the main body 6, so that the main body 6 freely rotates on the whole formed by the bottom support 1 and the surface support 8 and does not slide out.

Furthermore, the bottom support 1 and the surface support 8 are fixed by the screws 2, the free rotation is achieved by controlling degree of tightness of the bottom support 1 and the main body 6 through using the elastic positioning parts 3. Due to the fact that the elastic positioning parts 3 are made of plastic, the production and assembly error is solved by utilizing the free elasticity of plastic, and the noise is further effectively reduced in the rotating process.

As shown in FIG. 1, in one embodiment, the plurality of the elastic positioning parts 3 are uniformly disposed on an edge part of the bottom support 1, and the elastic positioning parts 3 are disposed on an upper end of the bottom support 1 in the annular array. Due to a fact that the elastic positioning parts 3 are disposed on an upper end of the bottom support 1 in the annular array, uniformity of the degree of the tightness between the bottom support 1 and the main body 6 controlled by the elastic positioning parts 3 is effectively improved. So that stability of the rotating process is further ensured.

Furthermore, in one embodiment, the elastic positioning parts 3 are arc-shaped. An adjusting track of the degree of tightness which whole is circular is further formed according to the elastic positioning parts 3 disposed as the annular array, which effectively improves stability of an adjusting process. The surface support 8 is positioned by cooperation of the limiting surface 5 and the limiting columns 7 and is further fixed by the screws 2. After fixation, the free rotation is further achieved by controlling the degree of the tightness through the elastic positioning parts made of the plastic, which effectively prolongs a service life of the protective case for the mobile phone and the tablet computer.

Certainly, the above structure is only a preferred structure. The elastic positioning parts 3 can also be other shapes such as U-shaped, which is specifically set according to actual requirements, and is not limited herein.

Figure 2:
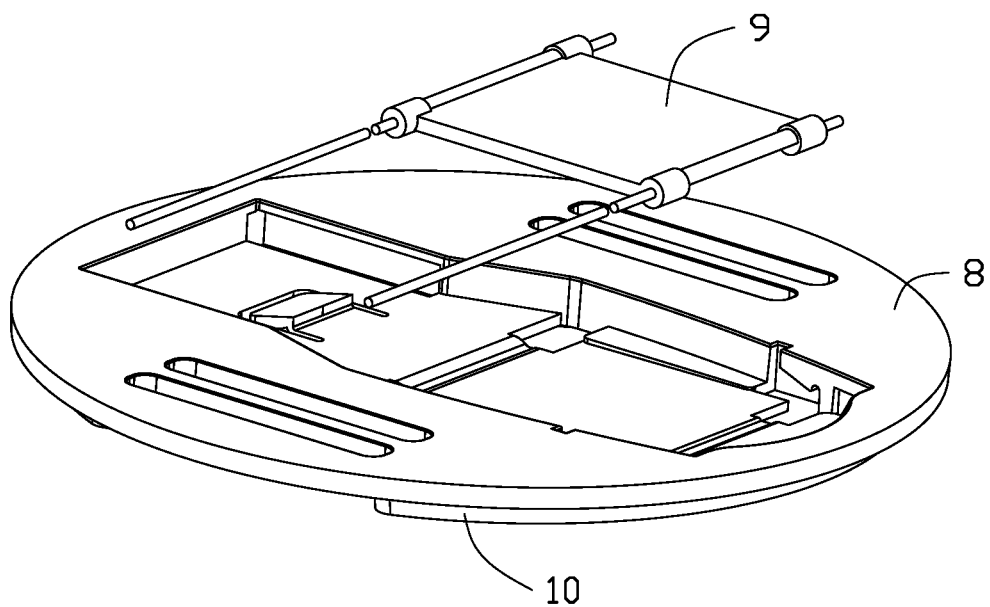
FIG. 2 is a schematic diagram of a connection relationship between a surface support and a supporting plate of the protective case for the mobile phone and the tablet computer of the present disclosure.

As shown in FIGS. 1-2, in one embodiment, a surface cover (not shown in the drawings) is correspondingly disposed on the surface support 8, and the surface cover is engaged with the surface support 8, which is convenient for installing and disassembling. When the supporting plate 9 is not in a configuration of use, the surface cover covers the supporting plate 9, so that the supporting plate 9 is protected. It is convenient for the users to freely rotate the protective case on palms by using the bottom support and the surface support. Meanwhile, the protective case for the mobile phone and the tablet computer is capable to be carried with a hand strap, so that the users can freely rotate the protective case on palms.

Furthermore, in one embodiment, a connecting part 10 matched with the limiting surface 5 is correspondingly disposed on a lower end of the surface support 8. The connecting part 10 is two arc-shaped protrusions symmetrically disposed. The connecting part 10 is clamped into the limiting surface 5 to limit the main body 6, which is simple and convenient.

Certainly, the above structure of the connecting part 10 is only a preferred structure. The connecting part 10 can also be other shapes such as U-shaped, which is specifically set according to actual requirements, and is not limited herein. The bottom support 1 and the surface support 8 are detachably connected by the connecting part 10, so that combination and separation are achieved. Parts not referred are same to the prior art or can be realized by adopting the prior art.

The present disclosure provides the protective case for the mobile phone and the tablet computer, including the bottom support 1, the surface support 8, and the supporting plate 9. The surface support 8 positioned by cooperation of the limiting surface 5 and the limiting columns 7, and the free rotation of the main body 6 is achieved by controlling degree of tightness through using the plurality of the elastic positioning parts 3 at the same time, so that the main body 6 for the mobile phone and the tablet computer freely rotates. The main body 6 is supported by the supporting plate 9, so that users further adjust the supporting angles arbitrarily. Problems that the conventional protective cases for the mobile phones and the tablet computers cannot achieve the 360-degree free rotation and adjust the supporting angles arbitrarily at the same time are further solved. Due to the fact that the elastic positioning parts 3 are made of the plastic, the production and assembly error is solved by utilizing the elasticity of the plastic, and the noise is further effectively reduced in the rotating process. The users can freely rotate the protective case on palms, so that service lives of the mobile phones and the tablet computers are effectively prolonged.

It should be noted in the description of the present disclosure that, unless otherwise regulated and defined, terms such as "installation," "connected," and "connecting" shall be understood in broad sense, and for example, may refer to fixed connecting or detachable connecting or integral connecting; may refer to mechanical connecting or electrical connecting; and may refer to direct connecting or indirect connecting through an intermediate medium or inner communication of two elements. For those of ordinary skill in the art, the meanings of the above terms in the present disclosure may be understood according to concrete conditions.

It should be understood that the specific embodiments described herein are only used to explain the present disclosure and are not intended to limit the present disclosure. Equivalent changes or modifications made by a scope of the present disclosure are covered by the present disclosure.

What is claimed is:

1. A protective case for a mobile phone and a tablet computer, comprising a main body and a rotatable bottom support located at a lower end of the main body;
   wherein a rear side of the main body is configured to receive the mobile phone or the tablet computer;
   wherein a surface support configured to match with the bottom support is disposed on an upper end of the main body, and a supporting plate is disposed on the surface support;
   wherein an opening is disposed on the main body; the bottom support and the surface support pass through the opening; the bottom support is rotatable 360 degrees and is connected with the surface support to realize 360-degree rotation of the main body;
   the supporting plate is hinged with the surface support through a telescopic rod of the supporting plate; the supporting plate is configured to support the main body; the telescopic rod is extendable and retractable and is configured to adjust a distance between the main body and the supporting plate to adjust a placement angle of the main body;
   wherein the bottom support comprises a limiting surface configured to match with the surface support, elastic positioning parts disposed on the bottom support, positioning points, and a plurality of limiting columns; the plurality of the limiting columns are uniformly disposed on an upper end of the limiting surface; and
   wherein the elastic positioning parts are made of plastic; the positioning points are uniformly disposed on the bottom support at an outer side of the elastic positioning parts.

2. The protective case for a mobile phone and a tablet computer according to claim 1, wherein a plurality of through holes, configured to match with screws, are disposed on the bottom support.

3. The protective case for a mobile phone and a tablet computer according to claim 1, wherein the plurality of limiting columns are disposed on the upper end of the limiting surface in an annular array.

4. The protective case for a mobile phone and a tablet computer according to claim 1, wherein the elastic positioning parts are arc-shaped.

5. The protective case for a mobile phone and a tablet computer according to claim 4, wherein a surface cover is correspondingly disposed on the surface support, and the surface cover is engaged with the surface support.

6. The protective case for a mobile phone and a tablet computer according to claim 5, wherein a connecting part matched with the limiting surface is correspondingly disposed on a lower end of the surface support.

* * * * *